(12) United States Patent
Horne

(10) Patent No.: US 6,738,920 B1
(45) Date of Patent: May 18, 2004

(54) METHOD FOR DERIVING ADDRESSES FOR A PLURALITY OF SYSTEM COMPONENTS IN RESPONSE TO MEASUREMENT OF TIMES OF RECEIPT OF TWO SIGNALS BY EACH COMPONENT

(75) Inventor: Arthur P. Horne, Everett, WA (US)

(73) Assignee: Eaton Corporation, Cleveland, OH (US)

( * ) Notice: Subject to any disclaimer, the term of this patent is extended or adjusted under 35 U.S.C. 154(b) by 613 days.

(21) Appl. No.: 09/724,447

(22) Filed: Nov. 28, 2000

(51) Int. Cl.$^7$ .................................................. G06F 1/04
(52) U.S. Cl. .......................................... 713/500; 710/9
(58) Field of Search ................................ 710/9, 104, 8; 713/500

(56) References Cited

U.S. PATENT DOCUMENTS

| | | | |
|---|---|---|---|
| 4,730,251 A | * 3/1988 | Aakre et al. ................. 710/104 |
| 4,773,005 A | * 9/1988 | Sullivan ........................ 710/9 |
| 5,204,669 A | 4/1993 | Dorfe et al. ........... 340/825.52 |
| 5,262,771 A | 11/1993 | Hermann et al. ...... 340/825.08 |
| 5,404,460 A | * 4/1995 | Thomsen et al. .............. 710/9 |
| 5,452,424 A | 9/1995 | Goeppel ..................... 395/650 |
| 5,495,575 A | 2/1996 | Hermann et al. ........ 395/200.1 |
| 5,914,957 A | 6/1999 | Dean et al. ................. 370/438 |

FOREIGN PATENT DOCUMENTS

| WO | WO 94/16382 | * 7/1994 | ............. G06F/9/00 |

* cited by examiner

*Primary Examiner*—Thomas Lee
*Assistant Examiner*—P. Chandrasekhar
(74) *Attorney, Agent, or Firm*—George E. Haas; Quarles & Brady LLP

(57) ABSTRACT

A plurality of modules are connected in a series and addresses are automatically assigned to the modules upon the application of power. At that time, a module sends a signal to all of the other modules which causes a first timer to be started in each module. After a predefined period, an initial module, at one end of the series, sends a timing signal to the next module in the series. Each module upon receiving a timing signal starts a second timer, delays for the predefined period, and then sends a timing signal to the next module in the series. When terminal module at the opposite end of the series receives a timing signal, that module sends a second signal to all of the modules which causes the modules to stop all of the first and second timers. Each module then uses the values of its respective timers to derive a unique address.

17 Claims, 2 Drawing Sheets

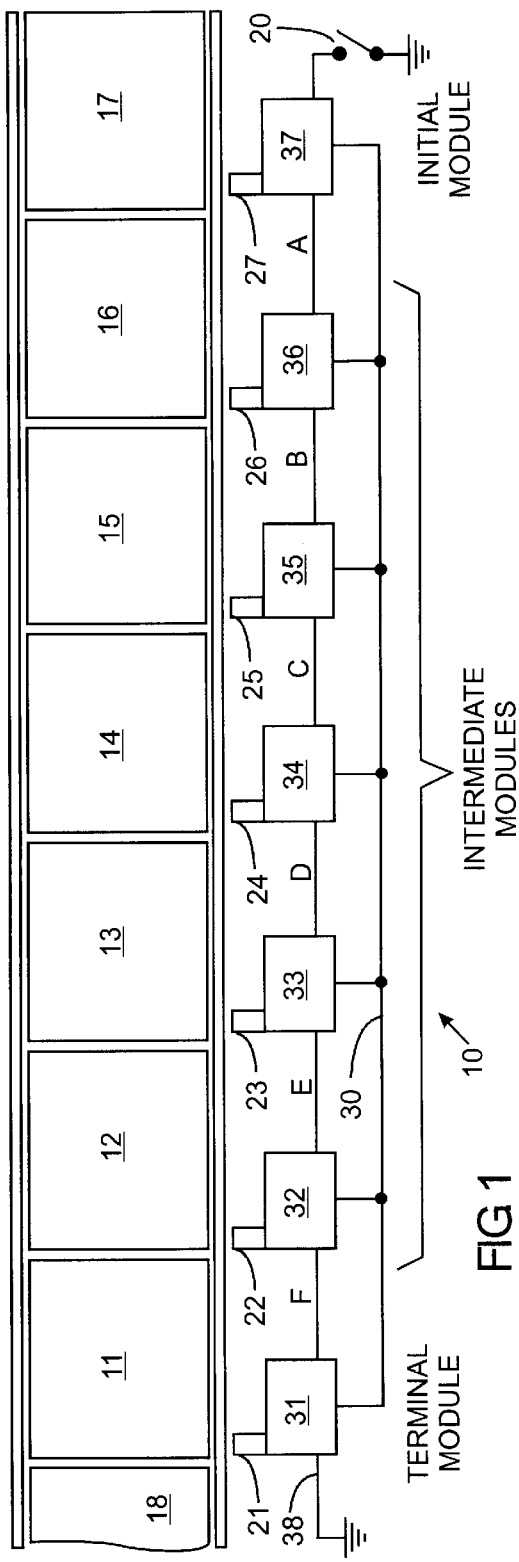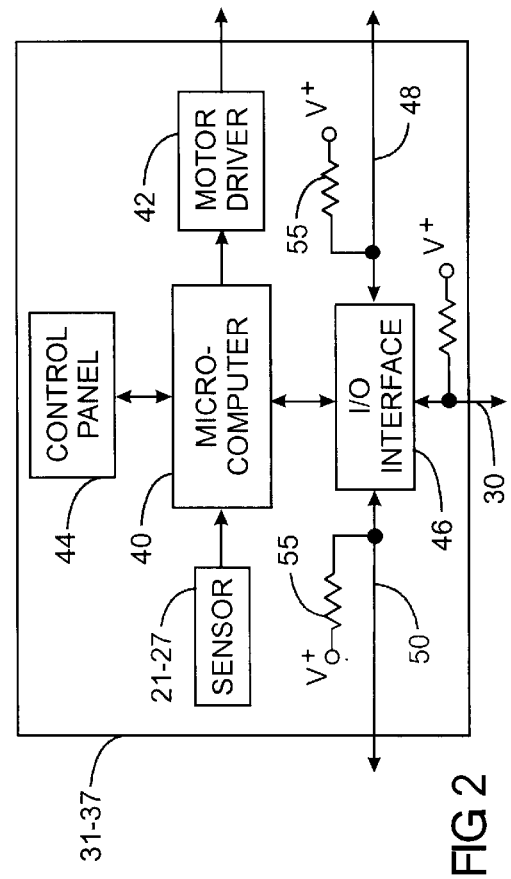

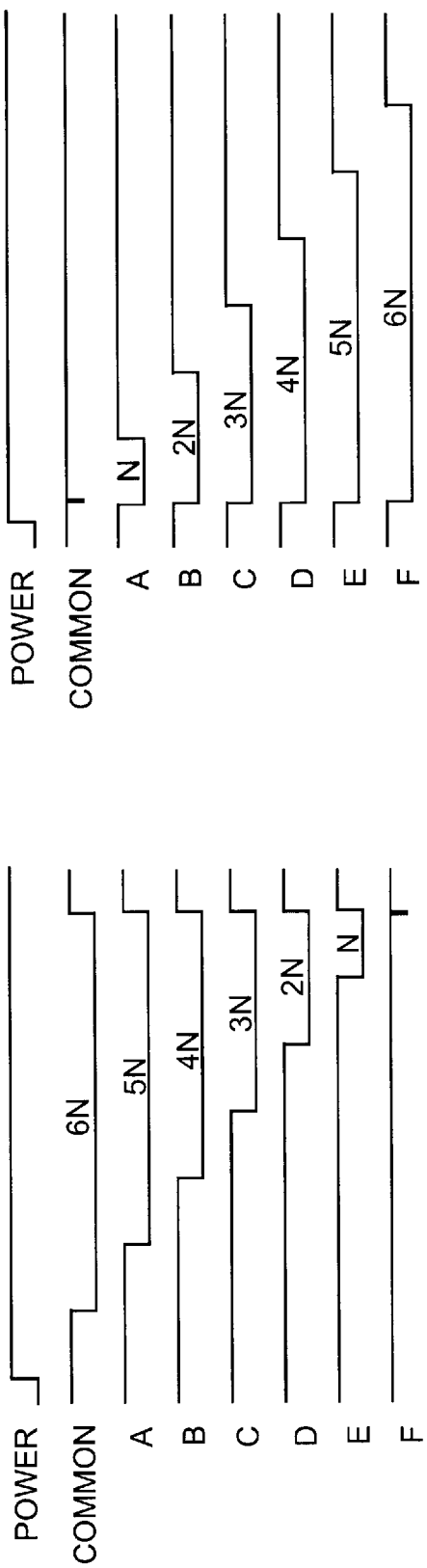
FIG 3
FIG 5
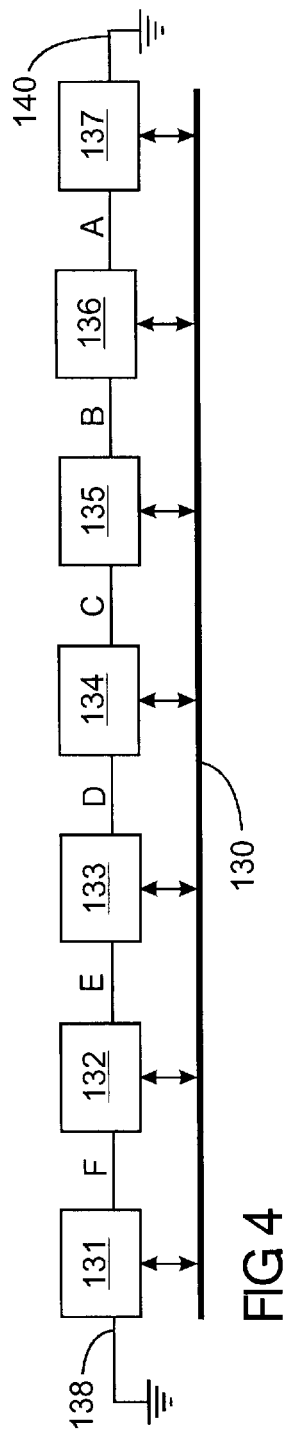
FIG 4

METHOD FOR DERIVING ADDRESSES FOR A PLURALITY OF SYSTEM COMPONENTS IN RESPONSE TO MEASUREMENT OF TIMES OF RECEIPT OF TWO SIGNALS BY EACH COMPONENT

FIELD OF THE INVENTION

The present invention relates to computer systems in which a plurality of components interact with one another in a manner which requires that each component know its relationship to the other components. That relationship may be physical, as in a daisy chain connection of components, or it may be virtual, as in the assignment of addresses to components on a communication bus. The present invention relates in particular to how each component determines that relationship.

BACKGROUND OF THE INVENTION

A control system for complex equipment often is divided into subsections which control different portions of the equipment. For example, a large material handling system may be divided into a cascade of conveyor sections with a separate microcomputer controller governing the performance of each section. In order for the separate sections to operate in a cooperative manner, the microcomputer controllers have to communicate among one another.

That communication may be accomplished through conductors which interconnect the controllers in a daisy chain. In this communication scheme a given controller is able to send and receive messages to and from only the immediately adjacent controllers in the chain. Messages can be relayed along the daisy chain from one controller to the next one. Nevertheless to properly control the flow of objects along the conveyor system, it is important that each controller know its relative location, or address, along the conveyor and thus along the daisy chain. Thus during installation, the address of each controller is designated, such as by a technician setting a number of switches in each controller.

In another configuration, a shared communication bus extends along the conveyor system and every controller in connected to the bus. Each controller is assigned a unique bus address. When one controller desires to communicate with another controller, a message containing the address of the intended recipient is transmitted over the communication bus.

The greater the number of devices that must communicate with each other in both these communication techniques, the greater the likelihood that one of the devices may be configured with an incorrect address. Accordingly it is desirable to provide an apparatus and method by which the address of each device can be set automatically.

SUMMARY OF THE INVENTION

The present method assigns addresses to a series of modules connected to a common conductor. The series has an initial module and a terminal module at opposite ends with at least one intermediate module there between.

In response to an occurrence of a predefined event, such as power-up of the modules, a first signal is sent via the common conductor to the modules. Upon receiving the first signal, a first timer is started within each intermediate module and within the terminal module. A predefined period after receiving the first signal, the initial module sends a timing signal to an adjacent module in the series. When an intermediate module receives a timing signal, the respective module starts a second timer and a predefined period thereafter sends a timing signal to an adjacent module in the series. Upon receiving a timing signal, the terminal module sends a second signal via the common conductor.

In response to receiving the second signal, each of the intermediate modules derives an address in response to its first timer and its second timer, and the terminal module derives an address from its first timer. In the preferred embodiment of the present method, each intermediate module derives the address according to the expression:

$$ADDRESS = (T1-T2)/N$$

where T1 is a value from the first timer of the respective intermediate module, T2 is a value from the second timer of the respective intermediate module, and N is the predefined period. In that preferred embodiment, the terminal module derives the address according to the expression:

$$ADDRESS = T1/N$$

where T1 is a value from the first timer of the terminal module and N is the predefined period.

BRIEF DESCRIPTION OF THE DRAWINGS

FIG. 1 is a schematic diagram of a conveyor system that incorporates the present invention to assign addresses to a plurality of modules;

FIG. 2 depicts components of one of the modules that controls a section of the conveyor system;

FIG. 3 is a timing diagram of signals exchanged among the modules during an automatic module address assignment process;

FIG. 4 is a schematic diagram of an alternative system in which the modules are connected to a shared communication bus; and FIG. 5 is a timing diagram of signals exchanged among the modules during a second embodiment of the automatic module address assignment process.

DETAILED DESCRIPTION OF THE INVENTION

The present invention is being described in the context of a computer controlled conveyor system 10 shown in FIG. 1, with the understanding that those skilled in the art will recognize that the inventive concept can be applied to numerous other types of systems where components communicate among one another.

The conveyor system 10 is divided into seven sections 11, 12, 13, 14, 15, 16 and 17 with each one having a separately controlled conveyor belt driven by a motor. Each section 11, 12, 13, 14, 15, 16 and 17 respectively has an article sensor 21, 22, 23, 24, 25, 26 and 27 and a module 31, 32, 33, 34, 35, 36 and 37 that controls its conveyor motor. The modules 31–37 are connected to a common conductor 30 and in a series by daisy chain conductors A, B, C, D, E, and F. Power lines (not shown) also connect to the modules 31–37.

With reference to FIG. 2, each module 31–37 has a microcomputer 40 with an internal memory that contains a program which is executed to govern the operation of the associated section of the conveyor system 10. The associated article sensor 21, 22, 23, 24, 25, 26 or 27 is connected to an input of the microcomputer 40. A motor driver 42 receives output signals from the microcomputer and controls the motor for the respective conveyor section. A control panel 44 coupled to the microcomputer 40 provides indicator lights for the operational status of the conveyor section and the system in general. An input/output interface 46 couples the microcomputer 40 to downstream and upstream daisy chain conductors 48 and 50, respectively, from the adjacent modules and to the common conductor 30.

For energy conservation and to prolong equipment life, the conveyor sections 11–17 are stopped when articles are not being processed. When the first conveyor section 11 receives an article from another material handling device 18, the first sensor 21 detects that event. The first module 31 responds to an article detection signal from the, first sensor by pulling the common conductor 30 to ground potential. Each of the other modules 32–37 responds to this low level on the common conductor 30 by delaying for an interval that corresponds to the particular module's location along the conveyor system and then turning-on the motor for the associated conveyor section. The farther a particular module 32–37 is located along the conveyor system 10, the longer that the module delays.

Thus when the article reaches the opposite end of the first conveyor section 11, the second conveyor section 12 will have turned on to receive that article. The second conveyor section 12 moves the articles to the third conveyor section 13 and so on through the sequence of remaining conveyor sections 14–17. A person removes the articles from the seventh conveyor section 17 at the discharge end of the conveyor system. For example, the person may load the article on a truck for further transport.

The conveyor system 10 stacks the articles until the person is able to remove them. That is, the first article is sent down the sections until reaching the seventh section 17 at which point the seventh sensor 37 detects the presence of that article and sends a signal to a seventh module 37. That seventh module 37 responds by stopping the seventh conveyor section thereby holding the article at that location. In addition, the seventh module 27 sends a signal on daisy chain conductor A which notifies the sixth module 36 that the seventh section 17 is stopped and holding an article. The next article entering conveyor system 10 is transported to the sixth conveyor section 16 where it is held. This process repeats storing articles in each conveyor section 11–17 as necessary.

Eventually a person removes the article from the seventh conveyor section 17 and momentarily closes a switch 20 to advance the next article to the seventh conveyor section. Activation of switch 20 sends a signal via conductors A, B, C, D, E, and F through all the modules 31–37. That signal causes the articles stored in the upstream conveyor sections 11–16 to be advanced one section to the discharge end where the person is stationed. This operation buffers the flow of articles to the person at a rate at which the person is able to handle them. A given conveyor system may contain a greater or lesser number of conveyor sections as is required to buffer the flow of articles.

The proper operation of the conveyor system 10 requires that each module 31–37 know its location along the sequence of conveyor sections 11–17. Thus whenever the conveyor system is powered-up, the modules execute an automatic addressing procedure by which each module determines its location in the series modules. For this purpose the seventh module 37 is programmed specifically to control the discharge conveyor section 17 at the end of the conveyor system, while all of the other modules are programmed the same. Part of this programming is the preassignment of a unique address (e.g. 00) to the seventh module 37. The first module 31 also is unique in that its daisy chain input 38 which otherwise would connect to an adjacent module in the upstream direction of the flow of articles is connected to ground. This connection informs the first module 31 that it controls the first conveyor section 11 at the intake end of the conveyor system 10 and that it is the "terminal module" in the address assignment procedure as will be described".

With reference to FIG. 1, when power is applied to the conveyor system 10, the modules 31–37 go through a power-up sequence during which the voltage on their upstream daisy chain conductors 50 is checked. All the modules except the first module 31 will find a high voltage level on this conductor due to the internal pull-up resistors 55. The upstream daisy chain conductor 50 of the first module 31 is tied to ground and thus is at ground potential. In response to finding ground potential on its upstream daisy chain conductor 50, the first module 31 pulls the common conductor 30 to ground potential which commences the automatic addressing process. This application of ground potential forms a first signal that is send over the common conductor 30. Note that FIG. 3 depicts the timing of this common conductor signal and other signals sent along the series of modules formed by the daisy chain. Alternatively, the unique programming of the terminal module, seventh module 37 could cause that module to apply the ground potential to the common conductor 30 at this time.

The modules, including the first module 31, respond to ground potential on the common conductor 30 by starting a set of first timers implemented via software executed by the microcomputer 40 within each module. A predefined period N thereafter (e.g. N=3 milliseconds) the seventh module 37, which is at the discharge end of the conveyor system 10, pulls its upstream daisy chain conductor A to ground potential sending a timing signal. As noted previously the seventh module 37 is programmed differently than the other modules and is the only one preprogrammed with an address (address 0). With respect to the address assignment process, the seventh module 37 is defined as the "initial module" and the first module 31 at the other end of the daisy chain series is defined as the "terminal module." The remaining modules 32–36 between the initial module and the terminal module are referred to as "intermediate modules."

The next intermediate module upstream, the sixth module 36, detects its downstream daisy chain conductor A going low (to ground potential) and responds by starting a second internal timer. Then after delaying for the predefined period N, the sixth module 36 pulls its upstream daisy chain conductor B to ground potential sending another timing signal on that conductor. The fifth module 35 detects daisy chain conductor B going to ground and responds in the same manner as the sixth module did with respect to the signal on daisy chain conductor A. This process cascades through each of the modules in a direction that is opposite to the flow of articles along the conveyor system 10. When the downstream daisy chain conductor F of the first module 31 (the terminal module) goes low, that module pulls the common conductor 30 to a positive voltage potential thereby sending a second signal over the common conductor 30. All the modules respond to that second signal by stopping both of their internal timers. This cascade process through the series of modules produces a sequence of signals on the daisy chain conductors A–F as shown in FIG. 3.

At that time, one timer in each module contains a value equal to the interval that the common line was at ground potential. In this example with seven modules, that value equals six times the delay period N, or 6N. The second timer in each intermediate module and the terminal module has a value equal to the interval that its downstream daisy chain conductor was at ground potential as indicated in FIG. 3. As will become apparent the initial module, seventh module 37 does not require a second timer.

Next each module uses its timer values to derive its location address in the conveyor system. Specifically, the second timer value, corresponding to the interval that its downstream daisy chain conductor was at ground potential, is subtracted from the value in the first timer, corresponding to the interval that the common line was at ground potential. The difference then is divided by the predefined period N and the result, rounded to a whole number, is the module's address. For example, the third module 33 will have a second timer with a value of 2N, the interval that daisy chain conductor D was at ground potential. Subtracting 2N from 6N produces a difference of 4N which when divided by N results in an address of 4. This designates that the third module 33 is the fourth module from the seventh module 37 at the discharge end of the conveyor system 10. The addresses produced by these calculations are: seventh module 37—address 00, sixth module 36—address 01, fifth module 35—address 02, fourth module 34—address 03, third module 33—address 04, second module 32—address 05, first module 31—address 06. Based on these addresses each module can determine how long to delay before starting its conveyor section when an article is first received.

With reference to FIG. 4, the present invention can be used with modules 131–137 that communicate by sending messages over a shared communication bus 130. Thus each module must know its network address. Upon powering up of this embodiment, the first module 131, with its upstream daisy chain conductor 138 tied to ground, broadcasts a signal on the shared communication bus 130 which causes all the other modules to start their first timers. In this embodiment, the shared communication bus 130 serves as a common conductor. The seventh module 137 has its downstream daisy chain conductor 140 tie to ground which indicates that this module is to initiate the automatic address assignment process. Thus the seventh module 137 delays for the period N and then it pulls its upstream daisy chain conductor A to ground potential. The next module upstream, sixth module 136, detects its downstream daisy chain conductor A going low (at ground potential) and responds by starting a second internal timer. Then after delaying for the predefined period N, the sixth module 136 pulls its upstream daisy chain conductor B to ground potential. This process continues in the same manner as described above with respect to the embodiment of FIG. 1. The end result is that each module 131–137 has determined its address (00 to 07) on the shared communication bus 130.

With reference to FIGS. 1 and 5, an alternative embodiment of the present method has the initial, or first module 31 sending a first signal via the common conductor 30 to all of the other modules 31–37. Upon receiving that first signal, each of the other modules pulls its upstream daisy chain conductor A–F to ground potential and starts a timer. The terminal module, seventh module 37, also responds to the first signal by delaying the predefined period N and then pulling its upstream daisy chain conductor A to appositive voltage potential. Thus daisy chain conductor A remained at ground potential for an interval equal to the predefined period N.

The sixth module 36 responds to its downstream daisy chain conductor A going to a positive voltage potential by stopping its timer. Thus that timer has a value of N. The sixth module delays for another predefined period N and thereafter pulls its upstream daisy chain conductor B to a positive voltage potential. Thus this daisy chain conductor was at ground potential for an interval equal to 2N. This process ripples through the series of modules until the initial module 31 receives a timing signal, i.e. daisy chain conductor F to a positive voltage potential.

As the timer in each module stops, the value stored therein is divided by the predefined period N and the result rounded to the nearest integer to produce a unique address for that module. This latter embodiment eliminates the need for a second timer in each module.

What is claimed is:

1. A method for assigning unique identifiers to a plurality of modules in a series, wherein the series has an initial module and a terminal module at opposite ends with at least one intermediate module there between, said method comprising:

sending a first signal to the plurality of modules;

each intermediate module and the terminal module commencing measurement of time by using a timer in response to receiving the first signal;

a predefined period after receiving the first signal, the initial module sending a timing signal to an adjacent module in the series;

a predefined period after receiving a timing signal, each intermediate module sending a timing signal to an adjacent module in the series; and each intermediate module and the terminal module responding to the measurement of time by deriving a unique identifier in response to times of receipt of the first signal and the respective timing signal.

2. The method as recited in claim 1 further comprising:

upon receiving a timing signal, the terminal module sending a second signal to the plurality of modules;

each intermediate module measuring a first time interval which occurs between receiving the first signal and receiving the second signal;

each intermediate module measuring a second time interval which occurs between receiving a timing signal and receiving the second signal;

each intermediate module deriving a unique identifier in response to its first time interval and its second time interval; and the terminal module deriving a unique identifier from its first time interval.

3. The method as recited in claim 1 further comprising:

each intermediate module and the terminal module measuring a time interval which occurs between receiving the first signal and receiving a timing signal; and wherein the deriving a unique identifier comprises each intermediate module and the terminal module utilizes a measurement of the time interval.

4. The method as recited in claim 3 wherein the unique identifier (ID) is derived according to the expression:

$$ID=T1/N$$

where T1 is the measurement of the time interval and N is the predefined period.

5. A method for assigning addresses to a plurality of modules in a series, wherein the series has an initial module and a terminal module at opposite ends with at least one intermediate module there between, said method comprising:

sending a first signal to the plurality of modules;

upon receiving the first signal, starting a first timer within each intermediate module and within the terminal module;

a predefined period after receiving the first signal, the initial module sending a timing signal to an adjacent module in the series;

upon each intermediate module and the terminal module receiving a timing signal, starting a second timer within the respective intermediate module and terminal module;

a predefined period after receiving the timing signal, each intermediate module sending a timing signal to an adjacent module in the series;

upon receiving a timing signal, the terminal module sending a second signal to the plurality of modules;

in response to receiving the second signal, each of the intermediate modules deriving an address in response to its first timer and the second timer; and the terminal module deriving an address from its first timer.

6. The method as recited in claim 5 wherein one of the initial module and the terminal module sends the first signal.

7. The method as recited in claim 5 wherein each intermediate modules derives an address from a difference between values of the first timer and the second timer in the respective intermediate module.

8. The method as recited in claim 5 wherein each intermediate module derives an address according to the expression:

$$ADDRESS=(T1-T2)/N$$

where T1 is a value from the first timer of the respective intermediate module, T2 is a value from the second timer of the respective intermediate module, and N is the predefined period.

9. The method recited in claim 5 wherein the terminal module derives an address according to the expression:

$$ADDRESS=T1/N$$

where T1 is a value from the first timer of the terminal module and N is the predefined period.

10. A method for assigning addresses to a plurality of modules is a system wherein all of the plurality of modules are connected to a common conductor, and are connected in a daisy chain such that an initial module and a terminal module are connected to one adjacent module and intermediate modules connected between the initial module and a terminal module are connected to two adjacent ones of the plurality of modules, said method comprising:

sending a first signal via the common conductor;

upon receiving the first signal, starting a first timer within each intermediate module and within the terminal module;

a predefined period after receiving the first signal, the initial module sending a timing signal to an adjacent module in the daisy chain;

upon each intermediate module and the terminal module receiving a timing signal, starting a second timer within the respective one of the intermediate modules and the terminal module;

a predefined period after receiving the timing signal, each intermediate module sending a timing signal to an adjacent module in the daisy chain;

upon receiving a timing signal, the terminal module sending a second signal via the common conductor;

in response to receiving the second signal, each of the plurality of modules stopping its first timer and its second timer;

each of the intermediate modules deriving an address from values of its first timer and its second timer; and the terminal module deriving an address from a value of its first timer.

11. The method as recited in claim 10 wherein one of the plurality of modules sends the first signal via the common conductor.

12. The method as recited in claim 11 wherein the first signal and the second signal are messages sent over a shared communications bus which forms the common conductor.

13. The method as recited in claim 11 wherein each intermediate module derives an address from a difference between values of its first timer and its second timer.

14. The method as recited in claim 11 wherein each intermediate module derives an address according to the expression:

$$ADDRESS=(T1-T2)/N$$

where T1 is a value of the first timer, T2 is a value of the second timer, and N is the predefined period.

15. The method as recited in claim 11 wherein the terminal module derives an address according to the expression:

$$ADDRESS=T1/N$$

where T1 is a value of the first timer of the terminal module and N is the predefined period.

16. A method for assigning addresses to a plurality of modules in a series, wherein the series has an initial module and a terminal module at opposite ends with at least one intermediate module there between, said method comprising:

sending a first signal to the plurality of modules;

each intermediate module and the terminal module commencing measurement of time in response to receiving the first signal;

a predefined period after receiving the first signal, the initial module sending a timing signal to an adjacent module in the series;

a predefined period after receiving a timing signal, each intermediate module sending a timing signal to an adjacent module in the series; and each intermediate module and the terminal module deriving an address in response to its measurement of a time interval between receiving the first signal and receiving the timing signal.

17. The method as recited in claim 16 wherein each intermediate module and the terminal module derives an address according to the expression:

$$ADDRESS=T1/N$$

where T1 is a value of its first timer and N is the predefined period.

* * * * *